United States Patent Office 3,787,578
Patented Jan. 22, 1974

3,787,578
METHOD OF TREATING HELMINTHIASIS
James W. McFarland, Lyme, Conn., assignor to Pfizer Inc.
Application Apr. 24, 1970, Ser. No. 12,552, now Patent No. 3,684,802, which is a division of application Ser. No. 675,285, Oct. 16, 1967, now Patent No. 3,629,423, and which in turn is a continuation-in-part of abandoned application Ser. No. 580,856, June 27, 1966. Divided and this application Mar. 10, 1972, Ser. No. 233,763
Int. Cl. A61k 27/00
U.S. Cl. 424—263   3 Claims

ABSTRACT OF THE DISCLOSURE

New 1-(2-arylvinyl) and 1-(2-arylacyl)pyridinium and α-picolinium salts and their use as anthelmintic agents.

CROSS-REFERENCES TO RELATED APPLICATIONS

This application is a division of copending application Ser. No. 12,522, filed Apr. 24, 1970, now U.S. Pat. No. 3,684,802 which in turn is a division of application Ser. No. 675,285, filed Oct. 16, 1967, now U.S. Pat. No. 3,629,423, which in turn is a continuation-in-part of application Ser. No. 580,856, filed June 27, 1966, now abandoned.

BACKGROUND OF THE INVENTION

This invention relates to certain compounds which have been found to possess valuable therapeutic properties. More particularly, this invention relates to 1-(2-arylvinyl) pyridinium and α-picolinium salts and to 1-arylacyl-pyridinium and α-picolinium salts which are valuable in the control of helminthiasis in animals including pinworm and hookworm diseases.

Helminthiasis, the infestation of the animal body by various species of parasitic worms, is a very common and widespread disease affecting household and farm animals in all parts of the world. The economic significane of this disease is well known and has been the cause of extensive research on the control of helminthic parasites for many years. The effectiveness of the drugs used has not been entirely satisfactory for many reasons; e.g., limited anthelmintic spectrum, specificity of action, high cost and low activity.

SUMMARY OF THE INVENTION

The new and novel compounds of this invention are of the formula:

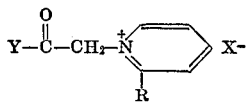

where Y is 2-thiazolyl, 4-thiazolyl, 5-thiazolyl, 4-isothiazolyl, 4-methyl-5-thiazolyl, 3-methyl-4-isothiazolyl, 3-pyrazolyl, 4-methyl-3-pyrazolyl, 3-methyl-4-pyrazolyl, 4-methyl-5-oxazolyl, 2-pyrrolyl, 1-methyl-2-pyrrolyl, 3-methyl-2-thienyl, 3-ethyl-2-thienyl or 3 halo-2-thienyl where halo is chloro, bromo or iodo, R is hydrogen or methyl; and X is a compatible anion.

Another aspect of this invention involves the discovery that certain known compounds, homologues, positional isomers or analogues of known compounds are unexpectedly effective anthelmintic agents. These compounds are of the above formula but where Y is 2-thienyl 3-thienyl, 2-furyl, 3-furyl, 3-methyl-2-furyl, phenyl, 2-methylphenyl, 2-ethylphenyl, 2-hydroxyphenyl, 3-hydroxy- phenyl, 4-hydroxyphenyl, 3-methyl-2-thienyl, 3-ethyl-2-thienyl, 2-methyl-3-thienyl, 2-halophenyl where halo is chloro, bromo, fluoro or iodo, or 3-halo-2-thienyl where halo is chloro, bromo or iodo; R is hydrogen or methyl; and X is anion of a pharmacologically-acceptable salt.

Also contemplated in this invention are 1-(2-hydroxy-2-arylethyl)pyridinium and α-picolinium salts which are valuable intermediates. These compounds have the formula:

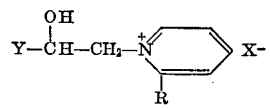

where Y is 2-thiazolyl, 4-thiazolyl, 5-thiazolyl, 4-isothiazolyl, 4-methyl-5-thiazolyl, 3-methyl-4-isothiazolyl, 3-pyrazolyl, 4-methyl-3-pyrazolyl, 3-methyl-4-pyrazolyl, 4-methyl-5-oxazolyl, 2-pyrrolyl, 1-methyl-2-pyrrolyl, 3-halo-2-thienyl where halo is chloro, bromo or iodo; R is hydrogen or methyl; and X is a compatible anion.

Another group of new and novel compounds of this invention, which are effective anthelmintic agents, are of the formula:

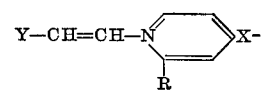

where Y is 2-thiazolyl, 4-thiazolyl, 5-thiazolyl, 4-isothiazolyl, 4-methyl-5-thiazolyl, 3-methyl-4-isothiazolyl, 3-pyrazolyl, 4-methyl-3-pyrazolyl, 3-methyl-4-pyrazolyl, 4-methyl-5-oxazolyl, 1-methyl-2-pyrrolyl, 2-pyrrolyl, 2-methylphenyl, 2-ethylphenyl or 3-halo-2-thienyl, where halo is chloro, bromo or iodo; R is hydrogen or methyl, and X is a compatible anion.

Still another aspect of this invention involves the discovery that several known compounds, homologues or positional isomers of known compounds are effective anthelmintic agents. These compounds are of the formula:

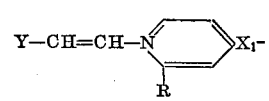

where Y is 2-thienyl, 3-thienyl, 2-furyl, 3-furyl, 3-methyl-2-furyl, phenyl, 2-hydroxyphenyl, 3-hydroxyphenyl, 3-hydroxpyhenyl, 3-methyl-2-thienyl, 3-ethyl-2-thienyl, 2-methyl-3-thienyl, 2-halophenyl where halo is chloro, bromo, iodo or fluoro; R is hydrogen or methyl; and $X_1$ is an anion of a pharmacologically-acceptable salt.

DETAILED DESCRIPTION OF THE INVENTION

The new and novel compounds of this invention are prepared according to the following sequence:

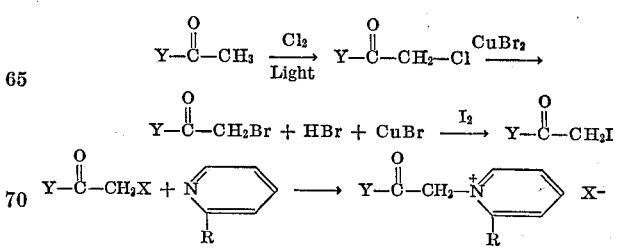

where X is chlorine, bromine or iodine,

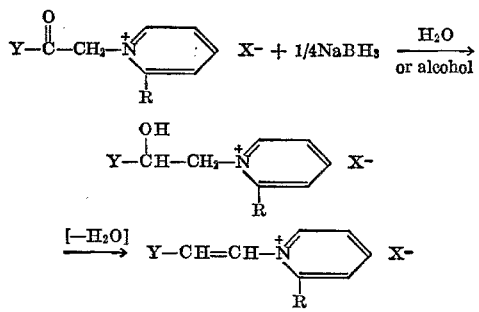

where Y, X and R are as aforesaid.

The aryl methyl ketones are halogenated to form the α-iodo, α-chloro or α-bromo compound by any of several known methods, such as reacting chlorine with the ketone in the presence of light, by reacting the ketone with cupric bromide, or by reacting the ketone with iodine. On the basis of economy and convenience the chloro and bromo compounds are preferred starting materials.

The pyridinium or α-picolinium salt of the ketone is prepared by reacting cupric bromide suspended in an organic solvent such as ethyl acetate with a chloroform solution of the ketone. The chloroform solution is preferably added dropwise to the refluxing suspension of cupric bromide to avoid too rapid an evolution of hydrogen bromide. The mixture is cooled to room temperature, the cuprous bromide is filtered from the mixture, the solvents are evaporated under reduced pressure and the oily residue of the crude α-bromoketone is taken up in chloroform. To the chloroform solution is cautiously added a molar equivalent amount and preferably an excess to ensure complete reaction, of pyridine or α-picoline. An exothermic reaction results. Generally, the products crystallize after the reaction solutions cool. The resulting pyridine or α-picoline salt may be recrystallized from methanol or the like. To an aqueous solution of the product is added a ¼ to ⅓ molar equivalent of sodium borohydride. The mixture is allowed to react at room temperature with stirring. The water is evaporated and the resulting alcohol may be recrystallized from alcohol solvents such as isopropanol and methanol. The alcohol product is dehydrated by heating it under reflux with a dehydrating agent such as an excess of benzoyl chloride, acetic anhydride/acetic acid mixture or by heating it in an autoclave at 220° C. with acetic anhydride and hydrochloric acid. While other reagents such as phosphorous pentoxide and tosyl chloride are effective, greater yields are obtained by the previously mentioned reagents. Benzoyl cholride is reacted with the alcohol at high temperatures, preferably at about 190° C. in a wax bath or the like, for about one hour or longer depending of course on the particular compound in question. The alcohol, acetic anhydride and hydrochloric acid are heated in an autoclave at about 220° C. for one hour or longer. After the dehydration is complete, the solvents and reagents are evaporated and the residue is taken up in acetone or acetone and water or a similar solvent. The resulting 1-(2-arylvinyl)pyridinium bromide crystallizes as the solvent mixture cools.

The chloride salt is prepared in the same manner starting with the α-chloro ketone. Other salts such as the monostearyl fumarate and the hexafluorophosphate, are prepared by reacting the arylvinylpyridinium or picolinium bromides or chlorides with the corresponding acids or their alkali metal salts, either at room temperature or at elevated temperature. Alternatively, the bromide salt may be converted to the chloride salt by treating a dilute aqueous solution of the bromide with an ion-exchange resin such as Amberlite IRA 400, 401 or 410 in the chloride cycle. Amberlite is a trademark of the Rohm and Haas Company. Other similar ion-exchange resins familiar to those skilled in the art may also be used.

The compatible anions of the salts of this invention are those prepared from aqueous acid solution a pH less than 9. The compatible anions include both pharmacologically-acceptable anions and those which are not pharmacologically-acceptable. The pharmacologically-acceptable anions are those formed from pharmaceutically-acceptable, salt-forming acids which do not substantially increase the toxicity of the base compound. The anions which are of particular value in therapy are those formed from hydrochloric, hydroiodic, hydrobromic, phosphoric, metaphosphoric, nitric, sulfuric, acetic, citric, tartaric, succinic, hexafluorophosphoric, monostearyl fumaric acids and the like. Compatible anions which are not pharmacologically-acceptable are those formed from such acids as perchloric and hydrofluoric. These anions, while not useful in therapy, are valuable for isolation and purification of these newly recognized biologically-active compounds. Furthermore, they are useful for the preparation of pharmacologically-acceptable salts.

A specific embodiment of the process of this invention as it relates to the control of helminthiasis comprises administering the compounds to subjects by the oral or by the parenteral route. In the treatment of helminthic infection, the oral route is preferred. An oral dose of from about 5 to 300 mg./kg. is recommended. Ordinarily, a single dose is sufficient but in the event multiple doses are employed, this dose may be repeated on two or three consecutive days. The oral route may be employed by mixing the effective ingredient with an emulsifying agent and employing a drench solution which is squirted down the throat so that the recommended level is reached in the animal.

Tablets, capsules and boluses can also be used to contact the effective ingredient with the parasites within the animal. In this case, the usual dose range is from ⅓ to 15 grams from animals weighing from 30 to 1000 pounds. The tablets, capsules and boluses are prepared by conventional means.

Dry mineral salt mixtures containing the 1-(2-arylvinyl) pyridinium salts, 1 - (2-arylvinyl) α-picolinium salts, 1-arylacyl pyridinium salts or the 1-arylacyl-α-picolinium salts are prepared containing from 0.1 to about 5.0% of the active ingredient mixed with salt (sodium chloride) and other minerals with which it is desired to treat the animal. These mixtures are fed on an ad libitum basis by adjusting the proportion of active ingredient in the mixture to the average daily consumption per animal so as to provide the proper daily dose as specified above.

The material can also be supplied to the animal by mixtures of 0.002 to about 5.0% of the compound admixed with feed. The daily dose of anthelmintic is usually mixed with only a portion of the animal's daily allotment to insure complete consumption of the dose.

It should be noted that the compounds may be administered either alone or in combination with pharmaceutically-acceptable carriers and diluents in both single and multiple dosages. For purposes of oral administration, tablets containing various excipients such as sodium citrate, calcium carbonate and dicalcium phosphate are used. Bonding agents such as polyvinylpyrrolidone, sucrose, gelatin and acacia together with disintegrants such as starch, alginic acid an certain complex silicates may be used. In addition, lubricating agents such as magnesium stearate, sodium lauryl sulfate and talc are often useful for tableting purposes. Solid compositions of a similar type may also be employed as fillers in soft elastic and hard-filled gelatin capsules. Preferred materials include lactose and high molecular weight polyethylene glycols. When aqueous suspensions are desired, the essential active ingredient is combined with emulsifying and/or suspending agents, together with such diluents as ethanol, propylene glycol, glycerine and various like combinations thereof.

For parenteral administration, solutions or suspensions of the salts in methyl stearate or other completely saturated vegetable oils may be employed. Aqueous solutions of the water-soluble compounds may also be used for parenteral administration. Such aqueous solutions should be suitably buffered if necessary and the liquid diluent rendered isotonic with sufficient saline or glucose.

EXAMPLE 1

1-[2-(3-methyl-2-thienyl)vinyl]pyridinium bromide (A) 1-(3-methyl-2-thenoylmethyl)pyridinium bromide: A suspension of 223 grams (1.0 mole) of cupric bromide in 400 ml. of ethyl acetate is vigorously stirred and heated under reflux, while a solution of 85.3 grams (0.6 mole) of methyl 3-methyl-2-thienyl ketone in 400 ml. of chloroform is added dropwise over a period of 30 minutes. The dark green solids of the reaction mixture change to nearly white over a period of 90 minutes, with vigorous evolution of hydrogen bromide. After cooling the mixture to room temperature, the cuprous bromide is filtered from the reaction mixture and the filtrate is evaporated under reduced pressure, to an oily residue which is taken up in 300 ml. of chloroform. The chloroform solution is filtered to free it of small amounts of insoluble material, and is then placed in a round-bottom flask equipped with a reflux condenser. Pyridine (94.3 grams, 1.2 mole) is added, and an exothermic reaction ensues. After stirring and cooling, the oil which forms crystallizes. After standing overnight at room temperature, the mixture is filtered and washed with chloroform to furnish 127.2 grams (85% of theory) of 1-(3-methyl-2-thenoylmethyl) pyridinium bromide. M.P. 250–251° C. Recrystallization from methenol yields a 1-(3-methyl-2-thenoylmethyl) pyridinium bromide melting at 259–261° C.

*Analysis.*—Calc'd for $C_{12}H_{12}BrNOS$ (298.72): C, 48.32; H, 4.06; N, 4.70. Found: C, 48.29; H, 4.12; N, 4.44.

(B) 1-[2-hydroxy-2-(3-methyl-2-thienyl)ethyl]pyridinium bromide: A stirred solution of 44.7 grams (0.15 mole) of 1-(3-methyl-2-thenoylmethyl)pyridinium bromide in 200 ml. of water is treated portionwise with 1.7 grams (0.045 mole) of sodium borohydride. The product begins to precipitate immediately upon addition of the hydride. After the final addition, the mixture is cooled in an ice bath; the product is filtered, washed with ice-cold water, and dried in a steam oven at 65° C. overnight. The yield is 41.2 grams, 91% of theory, of a yellow-brown solid, M.P. 219° C. (dec.). When the product is recrystallized twice from water, colorless crystals of 1-[2-hydroxy-2-(3-methyl-2-thienyl)ethyl]pyridinium bromide, M.P. 202–203° C. (dec.) are obtained.

*Analysis.*—Calc'd for $C_{12}H_{14}BrNOS$ (300.23): C, 48.00; H, 4.70; N, 4.67. Found: C, 48.21; H, 4.69; N, 4.60.

(C) 1-[2-(3-methyl-2-thienyl)vinyl]pyridinium bromide: To a 2-liter, 3-neck, round-bottom flask, equipped with a mechanical stirrer, reflux condenser and thermometer is added 0.6 mole of 1-[2-hydroxy-2-(3-methyl-2-thienyl)ethyl]pyridinium bromide and 600 ml. of benzoyl chloride. The mixture is heated at 110° C. for 10 minutes and then the temperature is slowly raised to 150° C. whereupon much foaming occurs. The temperature is raised to 180° C. and maintained at that temperature for one hour. The mixture is cooled to 80° C. and placed in an ice bath for several hours. The product is filtered, washed with acetone and air dried. Recrystallization from acetone/methanol produces a material melting at 231–232° C.

*Analysis.*—Calc'd for $C_{12}H_{12}BrNS$: C, 51.07; H, 4.29; N, 4.96. Found: C, 50.92; H, 4.40; N, 4.71.

EXAMPLE 11

1-[2-(2-thienyl)vinyl]pyridinium bromide monohydrate

A 2-liter, round bottom flask, equipped with a mechanical stirrer, reflux condenser and thermometer, is charged with 180 grams (0.632 mole) of 1-[2-hydroxy-2-(2-thienyl)ethyl]pyridinium bromide and 600 ml. of benzoyl chloride. The mixture is heated at 110° C. for 10 minutes and then the temperature is slowly raised to 150° C. whereupon much foaming occurs. After the foaming subsides (about 20 minutes), the temperature is raised to 180° C. and maintained there for one hour. The mixture is cooled to 80° C., and placed in an ice-bath for several hours. The dark crystalline product is filtered, washed with acetone and air-dried. The yield is 120 grams, M.P. 155–165° C. Further recrystallization from acetone/methanol (8:3) produces no improvement in the melting point range.

The monohydrate is prepared by adding 594 grams of recrystallized product obtained from several runs, to 800 ml. of water, adding activated carbon and filtering. The bright yellow filtrate is poured into 8 liters of absolute ethanol and stored at −30° C. for three hours. The crystals which form are filtered from the solution, washed with ether and air-dried overnight. The melting point of the product depends to a considerable extent on the technique employed. Generally, some melting at 98–100° C. is observed, but it is also possible to observe nothing until the melting point of the anhydrous material is obtained, i.e., 180–181° C.

*Analysis.*—Calc'd for $C_{11}H_{10}BrNS \cdot H_2O$ (286.11): C, 46.18; H, 4.23; N, 4.89; Br, 27.93. Found: C, 45.99; H, 4.35; N, 4.89; Br, 28.13.

EXAMPLE III

1-[2-(2-thienyl)vinyl]pyridinium hexafluorophosphate

A solution of 286 grams (1.0 mole) of 1-[2-(2-thienyl)vinyl]pyridinium bromide monohydrate in 3000 ml. of water is mechanically stirred at room temperature, while 224 grams (1.0 mole) of a 65% aqueous solution of hexafluorophosphoric acid is added in a steady stream over a period of one minute. The resulting precipitate is filtered, washed with water and with ethanol. The wet cake is taken up in a hot solution of 10 liters of absolute ethanol and 3 liters of acetone. Insoluble material is filtered and the filtrate is concentrated to about 9 liters volume whereupon crystals begin to form. The filtrate is cooled to 0° C. and the resulting crystalline product is filtered, washed with absolute ethanol and with hexane. The air-dried product weighs 270 grams, M.P. 182–183° C. Analytically pure material is obtained by recrystallization from a mixture of acetone and absolute ethanol followed by recrystallization from acetonitrile/ethyl acetate. The product melts at 178.5–181.0° C.

*Analysis.*—Calc'd for $C_{11}H_{10}F_6NPS$ (333.25): C, 39.64; H, 3.03; N, 4.20. Found: C, 39.67; H, 3.13; N, 4.24.

EXAMPLE IV

1-[2-(2-thienyl)vinyl]pyridinium monostearyl fumarate dihydrate

A mixture of 2.86 g. (0.01 mole) of 1-[2-(2-thienyl)vinyl]pyridinium bromide monohydrate, 50 ml. of water and 3.91 grams (0.01 mole) of sodium monostearyl fumarate is stirred for two hours at room temperature. During the course of the reaction the insoluble matter changes from white to bright yellow. The mixture is filtered, and the bright yellow crystalline product is dried in a vacuum dessicator to afford analytically pure 1-[2-(2-thienyl)vinyl]pyridinium monostearyl fumarate dihydrate: yield 5.11 grams, 86% of theory, M.P. 90–92° C.

*Analysis.*—Calc'd for $C_{33}H_{53}NO_6S$ (591.83): C, 66.97; H, 9.03; N, 2.37. Found: C, 66.62; H, 9.21; N, 1.78.

EXAMPLE V

1-[2-(4-methyl-5-oxazolyl)vinyl] α-picolinium bromide

This compound is prepared from methyl-4-methyl-5-oxazolyl ketone according to the procedure of Example I, parts (B) to (D), by substituting α-picoline for pyridine.

EXAMPLE VI

1-[2-(4-methyl-5-oxazolyl)vinyl]pyridinium bromide

This compound is prepared from methyl-4-methyl-5-oxazolyl ketone according to the procedure of Example I, starting with part (B).

EXAMPLE VII

The compounds of Table I are prepared according to the procedure of Example I. The ketone intermediates are prepared according to part (A). The hydroxy intermediates are prepared according to part (B) by reducing the keto group. The vinyl products are obtained according to part (C).

TABLE I

| Starting material | Product 1-(2-arylvinyl)pyridinium bromide |
|---|---|
| 2-acetylthiazole | [thiazol-2-yl]-CH=CH-N⁺(pyridinium) Br⁻ |
| 4-acetylthiazole | [thiazol-4-yl]-CH=CH-N⁺(pyridinium) Br⁻ |
| 5-acetylthiazole | [thiazol-5-yl]-CH=C-N⁺(pyridinium) Br⁻ |
| 4-acetylisothiazole | [isothiazol-4-yl]-CH=CH-N⁺(pyridinium) Br⁻ |
| 4-methyl-5-acetylthiazole | [4-methylthiazol-5-yl]-CH=CH-N⁺(pyridinium) Br⁻ |
| 3-methyl-4-acetylisothiazole | [3-methylisothiazol-4-yl]-CH=CH-N⁺(pyridinium) Br⁻ |
| 3-acetylpyrazole | [pyrazol-3-yl]-CH=CH-N⁺(pyridinium) Br⁻ |
| 4-methyl-3-acetylpyrazole | [4-methylpyrazol-3-yl]-CH=CH-N⁺(pyridinium) Br⁻ |
| 3-methyl-4-acetylpyrazole | [3-methylpyrazol-4-yl]-CH=CH-N⁺(pyridinium) Br⁻ |
| 2-acetylpyrrole | [pyrrol-2-yl]-CH=CH-N⁺(pyridinium) Br⁻ |
| 1-methyl-2-acetylpyrrole | [1-methylpyrrol-2-yl]-CH=CH-N⁺(pyridinium) Br⁻ |
| 4-methyl-5-acetyloxazole | [4-methyloxazol-5-yl]-CH=CH-N⁺(pyridinium) Br⁻ |

EXAMPLE VIII

The 1-(2-arylvinyl) α-picolinium bromides of Table II are prepared according to the procedures of Examples I and VI.

TABLE II

| Starting material | Product 1-(2-arylvinyl) α-picolinium bromides |
|---|---|
| 2-acetylthiazole | [thiazol-2-yl]-CH=CH-N⁺(α-picolinium, CH₃) Br⁻ |
| 4-acetylthiazole | [thiazol-4-yl]-CH=CH-N⁺(α-picolinium, CH₃) Br⁻ |
| 5-acetylthiazole | [thiazol-5-yl]-CH=CH-N⁺(α-picolinium, CH₃) Br⁻ |
| 4-acetylisothiazole | [isothiazol-4-yl]-CH=CH-N⁺(α-picolinium, CH₃) Br⁻ |
| 4-methyl-5-acetylthiazole | [4-methylthiazol-5-yl]-CH=CH-N⁺(α-picolinium, CH₃) Br⁻ |
| 3-methyl-4-acetylisothiazole | [3-methylisothiazol-4-yl]-CH=CH-N⁺(α-picolinium, CH₃) Br⁻ |
| 3-acetylpyrazole | [pyrazol-3-yl]-CH=CH-N⁺(α-picolinium, CH₃) Br⁻ |
| 4-methyl-3-acetylpyrazole | [4-methylpyrazol-3-yl]-CH=CH-N⁺(α-picolinium, CH₃) Br⁻ |
| 3-methyl-4-acetylpyrazole | [3-methylpyrazol-4-yl]-CH=CH-N⁺(α-picolinium, CH₃) Br⁻ |
| 2-acetylpyrrole | [pyrrol-2-yl]-CH=CH-N⁺(α-picolinium, CH₃) Br⁻ |
| 1-methyl-2-acetylpyrrole | [1-methylpyrrol-2-yl]-CH=CH-N⁺(α-picolinium, CH₃) Br⁻ |
| 4-methyl-5-acetyloxazole | [4-methyloxazol-5-yl]-CH=CH-N⁺(α-picolinium, CH₃) Br⁻ |

EXAMPLE IX

1-[2-(2-thienyl)vinyl]pyridinium chloride dihydrate (A) 1-(2-thenoylmethyl)pyridinium chloride: A solution of 30.0 g. (0.187 mole) of chloromethyl 2-thienyl ketone, prepared according to the procedure of W. S. Emerson and T. M. Patrick, Jr., J. Org. Chem., 13, 722-8 (1948), and 100 ml. of chloroform was treated with 30 ml. (0.38 mole) of pyridine.

The resultant solution was heated under reflux for 15 minutes, allowed to cool to room temperature, and then cooled further in an ice bath. The resultant crystalline product was filtered to yield 27.1 g. (63% of theory) of the desired pyridinium ketone; M.P. 94–98° C. (softened at about 60° C.). Recrystallization is from acetone/methanol for analysis, the product weighed 16.7 g., M.P. 94–97° C.

Analysis.—Calc'd for $C_{11}H_{10}ClNOS$ (239.73): C, 55.11; H, 4.21; N, 5.84. Found: C, 54.39; H, 4.32; N, 5.64.

(B) 1-[2-hydroxy-2-(2-thienyl)ethyl]pyridinium chloride: A solution of 16.0 g. (0.067 mole) of 1-(2-thenoylmethyl)pyridinium chloride in 100 ml. of water was treated portionwise with 0.84 g. (0.0233 mole) of sodium borohydride. After stirring for 30 minutes at room temperature, the aqueous solution was evaporated under reduced pressure to yield a solid residue which was recrystallized from isopropanol/methanol affording 7.3 g. (45% of theory) of the desired product: M.P. 218–219° C. The product was recrystallized again to yield 5.1 g. of product, M.P. 219–220° C.

Analysis.—Calc'd for $C_{11}H_{12}ClNOS$ (241.75): C, 54.65; H, 5.01; N, 5.79. Found: C, 54.55; H, 5.08; N, 5.62.

(C) 1-[2-(2-thienyl)vinyl]pyridinium chloride dihydrate: A solution of 50.8 g. (0.21 mole) of 1-[2-hydroxy-2-(2-thienyl)ethyl]pyridinium chloride and 125 ml. of benzoyl chloride was heated cautiously to 190° C. and held at that temperature for an hour. After cooling somewhat, the solution was concentrated by distilling most of the excess benzoyl chloride from the mixture under reduced pressure. The pot residue was triturated with acetone and ether to yield 39.0 g. of crude, dark-brown, crystalline material: M.P. 53–58° C. The crude product was recrystallized from a hot solution of acetone and water to effect solution. Cooling to room temperature and subsequent cooling to 0–5° C. gave 16.8 g. of bright yellow crystals: M.P. 65–66° C.; $\lambda_{max}$: (methanol) 240 m$\mu$ ($\epsilon$ 9400), 265 m$\mu$ ($\epsilon$ 10,000), 353 m$\mu$ ($\epsilon$ 16,000).

Analysis.—Calc'd for $C_{11}H_{10}ClNS \cdot 2H_2O$ (259.76): C, 50.86; H, 5.43; N, 5.39; Cl, 13.65. Found: C, 50.06; H, 5.50; N, 5.76; Cl, 13.98.

EXAMPLE X

1-[2-(2-thienyl)vinyl] α-picolinium bromide (A) 1-[2-hydroxy-2-(2-thienyl)ethyl] α-picolinium bromide: A solution of 60 g. (0.2 mole) of 1-(2-thenoylmethyl) α-picolinium bromide, prepared according to the procedure of Examples I and VI, and 300 ml. of water is treated with 2.26 g. (0.06 mole) of sodium borohydride in the manner of part (C), Example I. The product is filtered, washed with water, and is recrystallized from isopropanol to yield 1-[2-hydroxy-2-(2-thienyl)ethyl] α-picolinium bromide: M.P. 191–192° C.

Analysis.—Calc'd for $C_{12}H_{14}BrNOS$ (300.23): C, 48.00; H, 4.70; N, 4.67. Found: C, 47.76; H, 5.04; N, 4.30.

(B) 1-[2-(2-thienyl)vinyl] α-picolinium bromide: A mixture of 7.5 g. (0.025 mole) of the hydroxy compound of part (A) and 20 ml. of benzoyl chloride is treated in the manner of part (D), Example I. The crude crystalline product is recrystallized from isopropanol/methanol to yield 1-[2-(2-thienyl)vinyl] α-picolinium bromide: M.P. 188–189° C.; $\lambda_{max}$ ($H_2O$) 268 m$\mu$ (11,300); 329 m$\mu$ (11,200).

Analysis.—Calc'd for $C_{12}H_{12}BrNS$ (282.22): C, 51.07; H, 4.29; N, 4.96. Found: C, 51.14; H, 4.28; N, 5.01.

EXAMPLE XI 1-(2-methylstyryl)pyridinium bromide (A) 1-($\beta$ - hydroxy - 2 - methylphenethyl)pyridinium bromide: A solution of 80.3 g. (0.274 mole) of 1-(2-methylphenacyl)pyridinium bromide, prepared according to the procedure of J. W. Baker, J. Chem. Soc., 445 (1938), and 400 ml. of water is treated with 3.36 g. (0.091 mole) of sodium borohydride in the manner described in part (C), Example I. The product is filtered, washed with water and recrystallized from ethanol to yield 1 - ($\beta$-hydroxy-2-methylphenethyl)pyridinium bromide: M.P. 251–253° C.

Analysis.—Calc'd for $C_{14}H_{16}BrNO$ (249.20): C, 57.15; H, 5.48; N, 4.76. Found: C, 57.34; H, 5.27; N, 4.66.

(B) 1-(2-methylstyryl)pyridinium bromide: A mixture of 15.0 g. (0.05 mole) of the hydroxy compound of part (A) and 20 ml. of benzoyl chloride is treated in the manner of part (D), Example I. The crude crystalline product is recrystallized from acetone/methanol to yield 1-(2-methylstyryl)pyridinium bromide: M.P. 188–190° C.; $\lambda_{max}$: ($H_2O$) 229 m$\mu$ ($\epsilon$ 11,100); 318 m$\mu$ ($\epsilon$ 12,400).

Analysis.—Calc'd for $C_{14}H_{14}BrN$ (276.18): C, 60.88; H, 5.11; N, 5.07. Found: C, 61.08; H, 5.07; N, 4.89.

EXAMPLE XII

The arylvinyl pyridinium and α-picolinium salts were administered, at the levels indicated to mice infected with N. dubius, H. nana, N. muris and S. obvelata. The ratio of the number of mice cleared of the parasite to the number of mice infected, as shown in the table, indicates that the listed compounds are effective anthelmintic agents.

TABLE III

| Compound | Dose, mg./kg. x days | Mice, No. cleared/No. infected | | | |
| --- | --- | --- | --- | --- | --- |
| | | H. dubius | S. obvelata | H. nana | N. mures |
| 1-[2-(2-thienyl)vinyl]pyridinium chloride dihydrate | 200 x 1 | 4/4 | 4/4 | 0/4 | |
| Do | 50 x 1 | 4/4 | 4/4 | 0/4 | |
| Do | 12.5 x 1 | 3/4 | 0/4 | 0/4 | |
| 1-[2-(2-Thienyl)vinyl]pyridinium bromide monohydrate | 200 x 1 | 4/4 | 4/4 | 0/4 | |
| Do | 50 x 1 | 8/8 | 4/8 | 0/4 | 2/4 |
| Do | 12.5 x 1 | 3/8 | 0/8 | 0/8 | 0/4 |
| 1-[2-(2-thienyl)vinyl]pyridinium hexafluorophosphate | 100 x 1 | 4/4 | 0/4 | 0/4 | |
| Do | 25 x 1 | 3/4 | 0/4 | 0/4 | |
| Do | 6.25 x 1 | 1/4 | 0/4 | 0/4 | |
| Do | 100 x 3 | | | | 4/4 |
| Do | 25 x 3 | | | | 5/8 |
| 1-[2-(2-thienyl)vinyl]pyridinium monostearyl fumarate dihydrate | 62.5 x 1 | 3/4 | 0/4 | 0/4 | |
| Do | 31.25 x 1 | 2/8 | 0/4 | 0/4 | |

TABLE III—Continued

| Compound | Dose, mg./kg. x days | H. dubius | S. obvelate | H. nana | N. muris |
|---|---|---|---|---|---|
| Do | 15.125 x 1 | 1/12 | 0/4 | 0/4 | |
| Do | 50 x 3 | | | | 1/4 |
| Do | 12.5 x 3 | | | | 0/4 |
| 1-[2-(3-methyl-2-thienyl)vinyl]pyridinium bromide | 62.5 x 1 | 8/8 | 0/8 | 0/8 | |
| Do | 15.125 x 1 | 11/12 | 4/12 | 0/12 | |
| Do | 7.8 x 1 | 3/4 | | | |
| Do | 125 x 3 | | | | 3/3 |
| Do | 31.25 x 3 | | | | 7/8 |
| Do | 15.125 x 3 | | | | 0/4 |
| 1-[2-(2-thienyl)vinyl]α-picolinium bromide | 250 x 1 | 2/2 | 0/2 | 0/2 | |
| Do | 125 x 1 | 4/4 | 0/4 | 0/4 | |
| Do | 31.25 x 1 | 0/4 | 0/4 | 0/4 | |
| 1-styrylpyridinium bromide | 125 x 3 | 4/4 | 4/4 | 0/4 | 3/4 |
| Do | 62.5 x 3 | 4/12 | 0/12 | 0/12 | |
| Do | 31.25 x 3 | | | | 0/4 |
| 1-(2-methylstyryl)pyridinium bromide | 250 x 1 | 3/3 | 3/3 | 0/3 | 2/2 |
| Do | 62.5 x 1 | 3/4 | 4/4 | 0/4 | 1/4 |
| 1-(3-hydroxystyryl)pyridinium bromide dihydrate | 250 x 3 | 4/4 | 4/4 | 0/4 | |
| Do | 250 x 1 | 2/4 | 4/4 | 0/4 | |
| Do | 62.5 x 1 | 0/4 | 0/4 | 0/4 | |
| 1-[2-(2-furyl)vinyl]pyridinium bromide | 250 x 3 | 3/3 | 3/3 | 0/3 | |
| Do | 250 x 1 | 2/4 | 0/4 | 0/4 | |
| Do | 62.5 x 1 | 0/4 | 0/4 | 0/4 | |

EXAMPLE XIII

The ketone pyridinium and α-picolinium salts of Table IV were administered, at the levels indicated, to mice infected with N. dubius, H. nana, N. muris and S. obvelata. The ratio of the number of mice cleared of the parasite to the number of mice infected, as shown in the table, indicates that the listed compounds are effective anthelmintic agents.

where Y is 2-thiazolyl, 4-thiazolyl, 5-thiazolyl, 4-isothiazolyl, 4-methyl-5-thiazolyl, 3-methyl-4-isothiazolyl, 3-pyrazolyl, 4-methyl-3-pyrazolyl, 3-methyl-4-pyrazolyl, 2-pyrrolyl, 1-methyl-2-pyrrolyl, 4-methyl-5-oxazolyl, 2-thienyl, 3-thienyl, 2-furyl, 3-furyl, 3-methyl-2-thienyl, 2-methyl-3-thienyl, phenyl, 2-methylphenyl, 2-hydroxyphenyl, 3-hydroxyphenyl, 4-hydroxyphenyl, 2-chlorophenyl, 2-bromophenyl, 2-iodophenyl or 2-fluorophenyl, are found

TABLE IV

| Compound | Dose, mg./kg. x days | N. dubius | S. obvelata | H. nana | N. muris |
|---|---|---|---|---|---|
| 1-(2-thenoylmethyl)pyridinium iodide | 1,000 x 3 | 0/4 | 0/4 | 4/4 | |
| Do | 500 x 3 | 0/3 | 0/3 | 3/3 | |
| Do | 200 x 3 | 0/4 | 0/4 | 0/4 | |
| 1-phenacylpyridinium bromide | 500 x 3 | 0/4 | 0/4 | 3/4 | |
| Do | 250 x 3 | 0/8 | 0/8 | 8/8 | |
| Do | 125 x 3 | 0/4 | 0/4 | 0/4 | |
| 1-salicyloylmethylpyridinium bromide | 500 x 1 | 3/8 | 0/8 | 0/8 | |
| Do | 250 x 1 | 4/8 | 0/8 | 0/8 | |
| Do | 125 x 1 | 0/4 | 0/4 | 0/4 | |
| Do | 500 x 3 | | | | 6/8 |
| Do | 250 x 3 | | | | 4/8 |
| Do | 125 x 3 | | | | 1/8 |
| 1-(3-methyl-2-thenoylmethyl)pyridinium bromide | 125 x 1 | 4/4 | 0/4 | 0/4 | |
| Do | 62.5 x 1 | 8/8 | 0/8 | 0/8 | |
| Do | 31.25 x 1 | 1/4 | 0/4 | 0/4 | |
| 1-(2-methylphenacyl)pyridinium bromide | 250 x 3 | 4/4 | 0/4 | 0/4 | 3/4 |
| Do | 250 x 1 | 4/4 | 0/4 | 0/4 | 1/2 |
| Do | 62.5 x 1 | 1/4 | 0/4 | 0/4 | 0/4 |

EXAMPLE XIV

The ketone intermediates of the products of Examples VII and VIII which have the formulae:

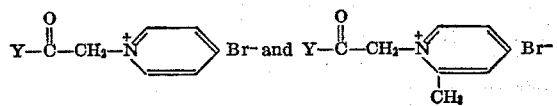

to be effective anthelmintic agents when tested according to the procedure of Example XIII.

When the sulfate, phosphate chloride, iodide, citrate, tartrate, hexafluorophosphate, monostearyl fumarate, acetate, and succinate salts are substituted for the bromide salt, they are found to be effective anthelmintic agents.

EXAMPLE XV

When the pyridinium and α-picolinium bromides listed in Table V are tested according to the procedure of Example XII, they are found to be effective anthelmintic agents.

TABLE V

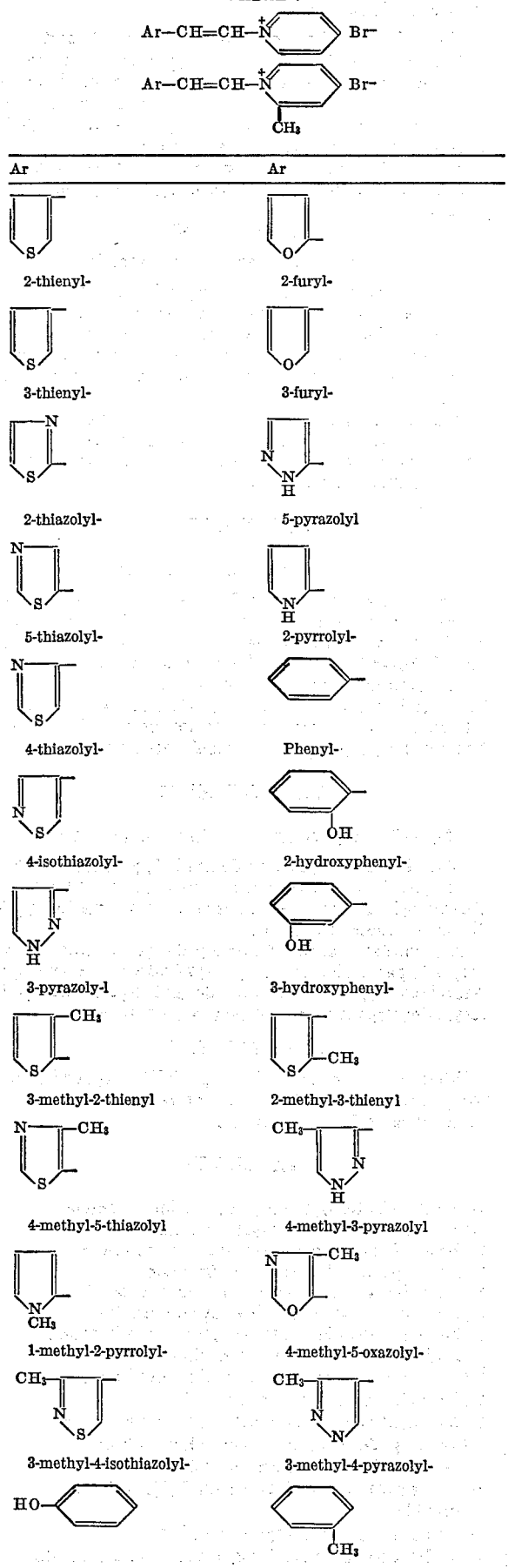

| Ar | Ar |
|---|---|
| 2-thienyl- | 2-furyl- |
| 3-thienyl- | 3-furyl- |
| 2-thiazolyl- | 5-pyrazolyl |
| 5-thiazolyl- | 2-pyrrolyl- |
| 4-thiazolyl- | Phenyl- |
| 4-isothiazolyl- | 2-hydroxyphenyl- |
| 3-pyrazoly-1 | 3-hydroxyphenyl- |
| 3-methyl-2-thienyl | 2-methyl-3-thienyl |
| 4-methyl-5-thiazolyl | 4-methyl-3-pyrazolyl |
| 1-methyl-2-pyrrolyl- | 4-methyl-5-oxazolyl- |
| 3-methyl-4-isothiazolyl- | 3-methyl-4-pyrazolyl- |
| 4-hydroxyphenyl | 2-methylphenyl |
| 2-chlorophenyl | 2-bromophenyl |
| 2-iodophenyl | 2-fluorophenyl |

When the sulfate, phosphate, chloride, iodide, citrate, tartrate, hexafluorophosphate, monostearyl fumarate, acetate, and succinate salts are substituted for the bromide salt, they are found to be effective anthelmintic agents.

EXAMPLE XVI

Acutely infected dogs containing over 500 hookworm ova/gram were fasted overnight and dosed orally with 1-[2 - (2 - thienyl)vinyl]pyridinium hexafluorophosphate at a level of 25 mg./kg. Food was withheld for another two hours and post-treatment fecal samples are obtained not less than 72 hours later and the ova counts are determined. The activity is based on percent reduction of ova burdens in feces. At the indicated level hookworm ova were reduced by more than 90%.

Following the same procedure, hookworm ova were reduced by more than 90% when 25 mg./kg. of 1-[2-(2-thienyl)vinyl]pyridinium bromide monohydrate was administered to infected dogs.

EXAMPLE XVII

Eighteen pigs, 3 to 4 weeks old were evenly divided by a random process among 6 pens on the basis of weight, sex and thriftiness. A standard pig diet containing respectively, 100, 100 and 50 grams per ton of Terramycin, Neomycin sulfate and penicillin was fed to the animals. Medication, as indicated in Table VI, was administered in water drench by stomach tube for four consecutive days. The pigs, except for the negative control pigs, were infected with a dose of $4 \times 10^5$ larvated ova of *Ascaris suum* on the second and third days of medication. The dosages administered were determined from the weights of the first day of the test. The pigs gained an average of 1.1 kg. during the four-day period of medication, thus the true dose rate is slightly less than indicated. The results of this experiment are given in Table VI. These results show that the compounds are very effective anthelmintic agents.

TABLE VI

| Treatment | Pigs | Lesion count-liver [1] | Lesion score-lung [2] | Ascaris larvae count [3] |
|---|---|---|---|---|
| Non-medicated uninfected controls | 3 | 0.66 | 1.0 | 0.0 |
| Non-medicated infected controls | 3 | 42.66 | 3.0 | 2,861.66 |
| Compound A, 20 mg./kg | 3 | 1.00 | 0.0 | 2.5 |
| Compound A, 100 mg./kg | 3 | 0.0 | 1.0 | 0.0 |
| Compound B, 8 mg./kg | 3 | 6.33 | 1.33 | 6.66 |
| Compound B, 40 mg./kg | 3 | 0.50 | 0.50 | 0.0 |

[1] Average number of Ascaris lesions in 6 sq. cm. on the dorsal aspect of the left central lobe.
[2] Average score by the method of Brown and Chan., Am. J. Vet. Res., 16, Oct. 1955; 6/3.
[3] Number of larvae recovered from 10 grams of lung tissue.
NOTE.—Compound A is 1-(2-methylstyryl)pyridinium bromide. Compound B is 1-[2-(3-methyl-2-thienyl)vinyl]pyridinium bromide.

EXAMPLE XVIII

The 1-[2-hydroxy -2 - (aryl)ethyl] α-picolinium and pyridinium salt intermediates listed in Table VII are prepared according to the procedure of Example I, part (C); Example IX, part (B); and Example XI, part (A), by reduction of the ketone intermediate.

TABLE VII.—HYDROXY INTERMEDIATES $$Y-\overset{O}{\underset{}{C}}-CH_2-N\underset{R}{\overset{}{\diagdown}}\diagup X^- \longrightarrow Y-\underset{OH}{\overset{H}{\underset{|}{C}}H}-CH_2-N\underset{R}{\overset{}{\diagdown}}\diagup X^-$$

| Y | R | X— |
|---|---|---|
| 2-thiazolyl | H— | Cl— |
| Do | CH₃— | Br— |
| 4-thiazolyl | CH₃— | PF₆— |
| Do | H— | I— |
| 5-thiazolyl | CH₃— | Citrate. |
| Do | H— | Fumarate. |
| 4-methyl-5-oxazolyl | H— | Tartrate. |
| Do | CH₃— | Acetate. |
| 4-isothiazolyl | CH₃— | Do. |
| 3-methyl-4-isothiazolyl | H— | Succinate. |
| 3-pyrazolyl | CH₃— | Cl— |
| Do | H— | Br— |
| 2-pyrrolyl | CH₃— | I— |
| Do | H— | Monostearyl fumarate. |
| 1-methyl-2-pyrrolyl | H— | I— |
| 4-methyl-3-pyrazolyl | H— | Cl— |
| 3-methyl-4-pyrazolyl | CH₃— | Br— |
| 4-isothiazolyl | H— | Br— |
| 4-methyl-5-oxazolyl | CH₃— | Cl— |
| 1-methyl-2-pyrrolyl | CH₃— | Cl— |
| 4-methyl-5-thiazolyl | H— | Br— |
| 3-methyl-4-isothiazolyl | CH₃— | Br— |
| 4-methyl-3-pyrazolyl | CH₃— | Cl— |
| 3-methyl-4-pyrazolyl | H— | I— |

EXAMPLE XIX

1-[2-(2-methyl-3-thienyl)vinyl]pyridinium bromide (A) Methyl 2-methyl-3-thienyl ketone: Under a nitrogen atmosphere, a solution of one mole of 3-bromo-2-methylthiophene in 500 ml. of dry diethyl ether is allowed to react with one gram-atom of magnesium turnings until the metal dissolves. A crystal of iodine is added to initiate the reaction. The resulting solution is then added dropwise with efficient stirring to a solution of 5 moles of ethyl acetate and 500 ml. of dry diethyl ether which is maintained at —70° C. by means of a Dry Ice/acetone bath. After the addition is complete, the solution is allowed to warm to room temperature, and is then heated under reflux for 2 hours. Ether is distilled from the mixture and the residue is taken up in 100 ml. of benzene. After cooling in an ice bath, the solution is cautiously treated with 200 ml. of water and then with 150 ml. of 6 N hydrochloric acid. Stirring is continued until all the precipitate dissolves. The organic layer is separated, and the aqueous layer is extracted several times with benzene. The combined organic phases are then evaporated under reduced pressure, and the residue is fractionally distilled to yield methyl 2-methyl-3-thienyl ketone.

(B) Following the procedure of Example I, parts (A), (B) and (C), 1-[2-(2-methyl-3-thienyl)vinyl pyridinium bromide is prepared from methyl 2-methyl-3-thienyl ketone.

EXAMPLE XX

1-[2-(3-halo-2-thienyl)vinyl]pyridinium bromides (A) The 1-(3 - halo-2-thenoylmethyl)pyridinium bromides, where halo is chloro, bromo or iodo, are prepared according to the procedure of Example I, part (A) starting with the following methyl ketones:

Methyl ketones:      Reference
- 3-chloro-2-thienyl — E. Profft and G. Solf, J. prakt. Chem., 24, 38 (1964).
- 3-bromo-2-thienyl — Steinkopf, Jacob and Penz, Ann., 152, 136 (1934).
- 3-iodo-2-thienyl — S. Gronowitz and L. Karlsson, Acta Chem. Scand., 17, 2120 (1963).

(B) The 1-[2-hydroxy - 2 - (3-halo - 2 - thienyl)ethyl] pyridinium bromides where halo is chloro, bromo or iodo are prepared from the corresponding 1-(3-halo-2-thenoyl-methyl)pyridinium bromide according to the procedure of Example I, part (B).

(C) Following the procedure of Example I, part (C), 1-[2-(3-chloro - 2 - thienyl)vinyl]pyridinium bromide, 1-[2-(3-bromo - 2 - thienyl)vinyl]pyridinium bromide and 1-[2-(3-iodo - 2 - thienyl)vinyl]pyridinium bromide are prepared from the corresponding 1-[2-hydroxy-2-(3-halo-2-thienyl)ethyl]pyridinium bromide.

In a similar manner, the corresponding α-picolinium compounds are prepared substituting α - picoline for pyridine.

EXAMPLE XXI 1-(2-ethylstyryl)pyridinium bromide

When in the procedure of Example I, part (A), methyl 2-ethylphenyl ketone, prepared according to the procedure of R. Riemschneider and H. G. Kassahn. Ber., 92, 1705 (1959), is substituted for methyl 3-methyl-2-thienyl ketone, 1 - (2 - ethylphenacyl)pyridinium bromide is obtained.

In a similar manner, following the procedures of Example I, parts (B) and (C), 1-(β-hydroxy-2-ethylphenethyl)pyridinium bromide and 1-(2-ethylstyryl) pyridinium bromide are obtained.

EXAMPLE XXII

1-[2-(3-ethyl-2-thienyl)vinyl]pyridinium bromide

When in the procedure of Example I, part (A), methyl 3-ethyl-2-thienyl ketone (Gerlach, Ann., 267, 153 (1882), is substituted for methyl 2-methyl-2-thienyl ketone, 1-(3-ethyl-2-thenoylmethyl)pyridinium bromide is obtained.

In a similar manner, and following the procedures of Example I, parts (B) and (C), 1-[2-hydroxy-2-(3-ethyl-2-thienyl)ethyl]pyridinium bromide and 1-[2-(3-ethyl-2-thienyl)vinyl]pyridinium bromide, are obtained.

EXAMPLE XXIII

1-[2-(3-methyl-2-furyl)vinyl]pyridinium bromide

When in the procedure of Example I, part (A), methyl 3-methyl-2-furyl ketone is substituted for methyl 3-methyl-2-thienyl ketone, 1-(3-methyl-2-furoyl methyl)pyridinium bromide is obtained.

In a similar manner, following the procedures of Example I, parts (B) and (C), 1-[2-hydroxy-2-(3-methyl-2-furyl)ethyl]pyridinium bromide and 1-[2-(3-methyl-2-furyl)vinyl]pyridinium bromide are obtained.

EXAMPLE XXIV

When the procedure of Example XIII is applied to the compounds of Table VIII, the compounds are found to be effective anthelmintic agents.

TABLE VIII 1-(3-chloro-2-thenoylmethyl)pyridinium bromide
1-(3-bromo-2-thenoylmethyl)pyridinium bromide
1-(3-iodo-2-thenoylmethyl)pyridinium bromide
1-(2-ethylphenacyl)pyridinium bromide
1-(3-ethyl-2-thenoylmethyl)pyridinium bromide
1-[2-(3-chloro-2-thienyl)vinyl]pyridinium bromide
1-[2-(3-bromo-2-thienyl)vinyl]pyridinium bromide
1-[2-(3-iodo-2-thienyl)vinyl]pyridinium bromide
1-[2-(3-ethyl-2-thienyl)vinyl]pyridinium bromide
1-(2-ethylstyryl)pyridinium bromide
1-[2-(3-methyl-2-furyl)vinyl]pyridinium bromide
1-(3-methyl-2-furoyl methyl)pyridinium bromide
1-[2-oxo-2-(2-pyrrolyl)ethyl]pyridinium bromide
1-[2-(1-methyl-2-pyrrolyl)-2-oxoethyl]pyridinium bromide
1-[2-(2-pyrrolyl)vinyl]pyridinium bromide
1-[2-(1-methyl-2-pyrrolyl)vinyl]pyridinium bromide

EXAMPLE XXV

When the procedure of Example I is repeated, substituting for methyl 3-methyl-2-thienyl ketone a methyl aryl ketone where aryl is 3-thienyl, 2-furyl, 3-furyl, phenyl, 2-methylphenyl, 2-hydroxyphenyl, 3-hydroxyphenyl, 4-hydroxyphenyl, 2-chlorophenyl, 2-bromophenyl, 2-iodophenyl or 2-fluorophenyl, the corresponding keto intermediates, the 2-hydroxyethyl intermediates and the vinyl products are formed.

What is claimed is:

1. A method of treating helminthiasis in animals which comprises administering to the animal an effective amount of a compound selected from the group consisting of those having the formula:

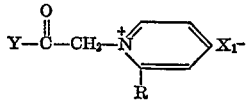

where Y is 2-pyrrolyl, 1-methyl-2-pyrrolyl, 2-thienyl, 3-thienyl, 2-furyl, 3-furyl, 3-methyl-2-furyl, 3-methyl-2-thienyl, 3-ethyl-2-thienyl, 2-methyl-3-thienyl, or 3-halo-2-thienyl where halo is chloro, bromo or iodo; R is hydrogen or methyl; and $X_1$ is an anion of a pharmacologically-acceptable salt.

2. The method of claim 1 where Y is 3-methyl-2-thienyl, R is hydrogen and $X_1$ is bromide.

3. The method of claim 1 where Y is 2-thienyl, R is hydrogen and $X_1$ is iodine.

References Cited
UNITED STATES PATENTS 3,274,205  9/1966  Bikales _____ 424—263

SAM ROSEN, Primary Examiner

UNITED STATES PATENT OFFICE
CERTIFICATE OF CORRECTION

Patent No. 3,787,578  Dated January 22, 1974

Inventor(s) James W. McFarland

It is certified that error appears in the above-identified patent and that said Letters Patent are hereby corrected as shown below:

Col. 1, line 23, "12,522" should read -- 12,552 --.

Signed and sealed this 14th day of January 1975.

(SEAL)
Attest:

McCOY M. GIBSON JR.　　　　　　C. MARSHALL DANN
Attesting Officer　　　　　　　　Commissioner of Patents